OPTICAL TESTING DEVICE AND METHOD OF USING THE SAME

Original Filed Dec. 8, 1966 3 Sheets-Sheet 1

INVENTOR.
JOSEPH S. NUPUF
BY
Teare, Teare & Sammon
ATTORNEYS

OPTICAL TESTING DEVICE AND METHOD OF USING THE SAME

Original Filed Dec. 8, 1966 3 Sheets-Sheet 2

INVENTOR.
JOSEPH S. NUPUF
BY
Teare, Teare & Sammon
ATTORNEYS

OPTICAL TESTING DEVICE AND METHOD OF USING THE SAME

Original Filed Dec. 8, 1966 3 Sheets-Sheet 3

INVENTOR.
JOSEPH S. NUPUF
BY
Teare, Teare & Sammon
ATTORNEYS

United States Patent Office

Re. 28,245
Reissued Nov. 19, 1974

28,245

OPTICAL TESTING DEVICE AND METHOD OF USING THE SAME

Joseph S. Nupuf, 1342 Cleveland Ave. NW.
Canton, Ohio 44703

Original No. 3,540,828, dated Nov. 17, 1970, Ser. No. 600,216, Dec. 8, 1966. Application for reissue Nov. 17, 1972, Ser. No. 307,514
Int. Cl. G01b *9/00*
U.S. Cl. 356—124 17 Claims

Matter enclosed in heavy brackets [ ] appears in the original patent but forms no part of this reissue specification; matter printed in italics indicates the additions made by reissue.

ABSTRACT OF THE DISCLOSURE

A system for measuring the curvature of the optical surface of an optic including a measuring instrument and a supporting device pivotally mounted thereon for rotation about a generally vertical axis. The measuring instrument includes a lens system having an optical axis which is maintained in a relatively fixed position during the measuring process. The supporting device includes a support member adapted for supporting the optic in alignment with the optical axis of the lens system, and an adjustment mechanism for rotating the optic about the aforementioned vertical axis for measuring the curvature of its optical surface along a horizontal plane extending through the geometrical center thereof.

*This application is a reissue of application Ser. No. 600,216 filed Dec. 8, 1966, now U.S. Pat. No. 3,540,828.*

This invention relates to apparatus and methods for use in determining optical characteristics, and more particularly relates to a measuring device and method for measuring the curvature of an optic, such as a contact lens, or the like, over its entire optical surface.

Heretofore, various instruments, such as the ophthalmometer, or keratometer, have been employed for measuring the radius of curvature of the anterior surface of a patient's eye. The measurement given by these instruments in accordance with present practice, however, relates only to the radius of curvature of the apical zone of the cornea. This area comprises the central zone of the cornea and is generally about 3 mm. to 4 mm. in diameter. Contact lenses are basically concave-convex in section wherein the posterior concave surface is formed to be mounted and worn directly against the wearer's eyes. Moreover, it is generally recognized that this posterior or concave surface of the lens must approximately match the curvature of the cornea to properly fit and allow for normal interchange of tear flow and wearer comfort together with the proper anterior or convex surface to afford normal vision for the wearer. Such heretofore known instruments being limited to measurement of the apical zone of the cornea, however, have not been capable of providing the necessary information for measurement of the entire optical surface of the cornea. The information given by these instruments is basically an absolute value which represents the difference in curvature between a high point and a low point within the apical zone which is generally referred to as the K measurement. This K measurement would, in most cases, be sufficient if the cornea were a perfect sphere. However, because the cornea is generally never of such regular shape, the K measurement must be supplemented by actual examination of the patient's eye. Moreover, because the K measurement does not give a true indication of the various radii of curvature of the human cornea, a great deal of trial and error has resulted to attain proper lens fitment. In addition, contact lenses are fitted in various ways and since the wearer does not at all times look through the center of the optical zone of the lens, but also looks along a visual axis near the top, near the bottom, or eccentric to the geometric and/or optical center of the lens, it is necessary to accurately measure the radius of curvature of *the functional portion of the* lens throughout its entire diameter or surface.

Accordingly, an object of the present invention is to provide a measuring device and method for using the same for accurately measuring the curvature of an optic from its geometrical center along a horizontal plane to its peripheral edge or over its entire diameter.

Another object of the present invention is to provide a measuring device and method of the character described for measuring all types of optics for contact lens, such as a lens having a toric outer surface including two radii of different dimensions and an inner spherical surface for use with astigmatic curvatures; a lens having an inner toric surface and a spherical outer surface for use with astigmatic curvatures and also to more readily center and fit the lens to the eye; a lens having an inner toric surface and an outer toric surface; a multiple-focal lens having a small central zone of about 4½ to 5 mm. for distance vision and a concentric outer peripheral zone of shorter radii for near vision; a multiple-focal lens having a small central zone of about 4½ to 5 mm. of one curvature for distance vision and a centric outer zone of another curvature for near vision; a multiple-focal lens incorporating astigmatic and/or toric curve surfaces for near and distance vision; and multiple-focal lens having a central spherical zone for distance vision and a concentric outer zone for near vision, etc.

Another object of the present invention is to provide a measuring device and method of the character described for accurately and efficiently fitting a contact lens to the human eye and which eliminates heretofore known techniques involving trial and error.

A further object of the present invention is to provide a measuring device and method of the character described which enables an optic, such as a contact lens, to be measured over its entire optical surface in order to verify the accuracy of the prescription and to insure that there are no defects of curvature or warping of the lens.

A still further object of the present invention is to provide a novel construction of a lens support which may be used in operable conjunction with and/or as an attachment piece for an optical instrument, such as an ophthalmometer, keratometer or the like, for measuring an optic, such as a contact lens, over its entire optical surface.

Further objects and advantages of the invention will become apparent from the following description of the invention taken in conjunction with the accompanying figures, in which.

Figure 9:
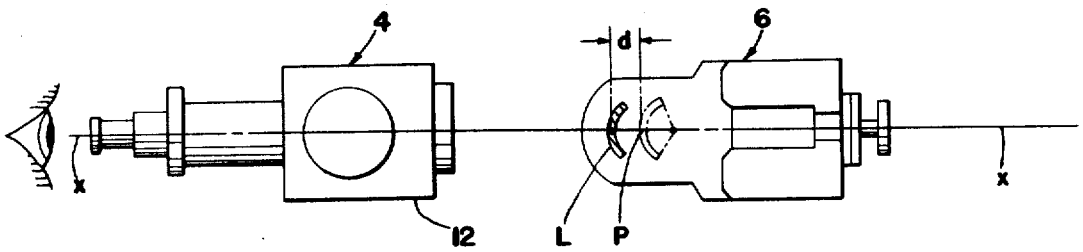

FIG. 9 is a diagrammatic illustration, on a reduced scale, showing the conjunctive operation of the lens measuring means and lens supporting means in optical alignment for measuring a convex surface; and FIGS. 10A, 10B, 11A and 11B are similar diagrammatic representations showing the various sequential steps for measuring a convex curvature and a concave curvature, respectively, in accordance with the present invention.

Figure 1:
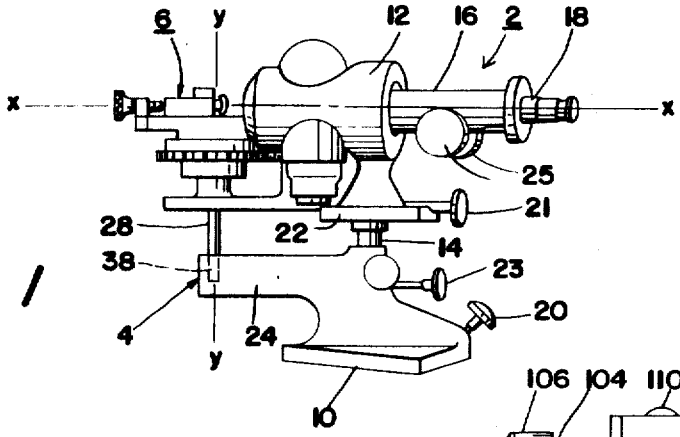
FIG. 1 is a generally perspective view, on a reduced scale, showing the novel lens supporting means of the invention operably mounted for use in conjunction with a lens measuring instrument, such as the keratometer.

Referring again to the drawings and in general to FIG. 1 thereof, there is shown one form of the optical measuring device, designated generally at 2, which includes a lens measuring means 4 and a lens supporting means 6 which operably coact for measuring an optic, such as a lens or similar optic, along a common horizontal axis or line of sight, as indicated at X—X.

In the embodiment shown, the lens measuring means 4 may preferably be of a conventional type ophthalmic instrument, such as an ophthalmometer, keratometer or the like. In the form shown, the keratometer includes a base 10 which mounts an optical head 12 which is disposed for rotational movement about a vertical axis on shaft 14. A barrel 16 extends outwardly from the head 12 and mounts an eyepiece 18 for observation by means of a lens system (not shown) of the head 12 for making optical measurements along the line of sight X—X.

An adjustable screw 20 may be provided for raising and lowering the head 12 with another adjustable screw 21 to cause backward and forward movement of the head 12 on guideway 22 for focusing (by cross hairs) the optical system. Adjustable screw 23 may be provided for raising and lowering a chin rest (not shown) mounted on the end of arm 24. Calibrated dials 25 are mounted on the barrel 16 for actuating a prismatic device (not shown) within the head of alignment of the mires, as known in the art.

In general, the radius of curvature of the surface of the cornea is measured by optically determining the size of the reflected image of an illuminated or transilluminated test object of known dimension produced by the corneal surface. An instrument, such as the keratometer, transfers a transilluminated test object for mire consisting of a circle of light with plus lines on either side marking the horizontal meridian of the cornea. In use, the eye of the observer looks in the eye piece, such as 18, which sees—via the lens system—the reflection of its own cornea and the mire also reflected upon it, which provides a fixation target. The lens system of the instrument causes a doubling of the mires which are then aligned by a conicidence focusing system which allows for a determination of the values of the corneal curvatures. These values are then indicated by the calibrated dials, such as 25 (FIG. 1), for the horizontal and vertical meridians, respectively. In use, the instrument, such as the keratometer, can readily be applied for measuring the curvature of the cornea in either diopters, millimeters of radius or both; and for measuring the curvature of optics, such as a lens or the like in a manner hereinafter to be more fully described.

In accordance with the invention, the lens supporting means 6 may be mounted on the lens measuring means 4 for optical measurement along the common line of sight X—X. When used in conjunction with an instrument, such as the keratometer, the conventional chin rest (not shown) of the instrument may be removed and replaced in a convenient manner by the lens supporting means 6, as best seen in FIG. 1.

As shown, the lens supporting means 6 comprises a generally L-shaped base 26 (FIG. 3) in top plan which is mounted on the stationary arm 24 of the keratometer by means of a vertical shaft 28. The shaft 28 is adapted to be disposed at one end within a bore 32 provided in a generally cylindrical hub 34 which is made integral with and which extends upwardly from the base 26. The shaft 28 may be adapted to its other end to be fitted within a bore 38 as provided in the arm 24 (FIG. 1) which bore ordinarily receives the chin rest for the instrument, as aforesaid. The base 26 also includes an upstanding generally L-shaped flange 40 (FIG. 3) made integral therewith which provides a support for the means which selectively rotates the device about the vertical axis Y—Y of shaft 28, as will be hereinafter more fully described.

A support table 42 (FIG. 2) may be mounted on the base 26 for rotational movement in a horizontal plane about a vertical axis Y—Y, as seen in FIG. 1. As shown, the table 42 includes an integral, annual collar 43 which depends downwardly therefrom and which is journaled for rotation about the shaft 28 on hub 34. The table 42 may be of a generally circular shape, in top plan, and may include an integral, upstanding plate member 44 of similar shape. To the plate 44 is integrally attached an upstanding head 46.

Figure 4:
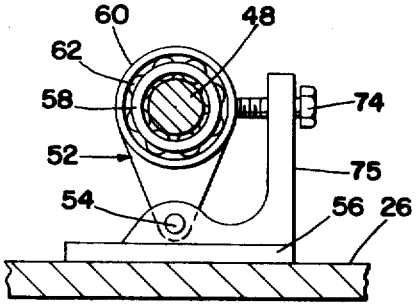
FIG. 4 is an enlarged, fragmentary vertical section taken along the line 4—4 of FIG. 2.

Rotation of the table 42 about the vertical axis Y—Y defined by shaft 28 may be accomplished by a generally horizontally disposed drive shaft 48 journaled at one end, as at 50, through the flange 40. The shaft 48 may be journaled adjacent its other end in a bearing support member 52 which is pivotally connected on a rod, as at 54, to a bracket plate 56 attached to the base 26. As best seen in FIG. 4, the bearing support 52 includes inner and outer race means 58 and 60 with suitable bearing means 62, such as ball bearings or the like, disposed therebetween for rotatably supporting the shaft 48. The resilient means 57 (FIG. 2), such as compression spring or the like, may be disposed around the pivot rod 54 so as to bear at one end against a flange 68 on the bracket plate 56 and at the other end against the bearing support member 52 for resiliently mounting the bearing support member 52 on the bracket plate 56.

The other end of the shaft 48 includes a worm gear 70 adapted to be disposed for selective meshing engagement with an endless annular gear thread 72 provided around the outer peripheral edge of the table 42 for rotating the table 42 upon turning movement of the shaft 48. The shaft may be locked in predetermined resilient biased engagement against the gear thread 72 by means of a suitable adjustable means 74 (FIG. 4), such as a set screw, threaded through an integral upstanding arm 75 attached to the bracket plate 56. The shaft 48 may be rotated about a horizontal axis by means of a suitable handle 73. A suitable motor means (not shown) could be applied for driving the shaft 48, as desired.

Figure 5:
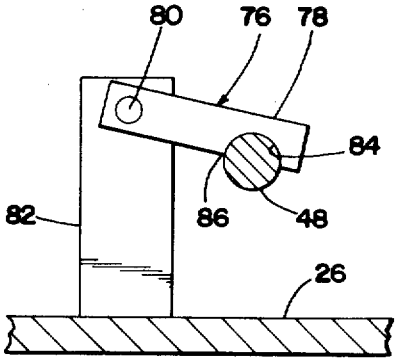
FIG. 5 is an enlarged, fragmentary vertical section view taken along the line 5—5 of FIG. 2.
Figure 6:
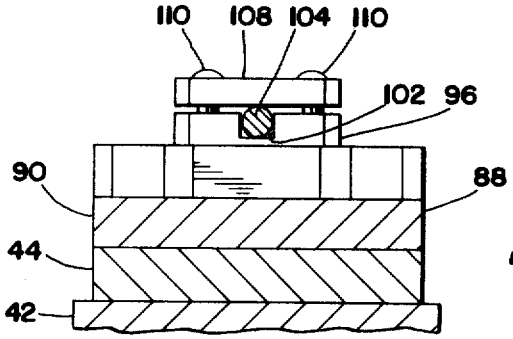
FIG. 6 is an enlarged, fragmentary vertical section view taken along the line 6—6 of FIG. 3.

Selected engagement and disengagement of the worm gear 70 with the gear thread 72 may be accomplished by a suitable locking means 76. As shown in FIG. 5, the locking means 76 includes a lever arm 78 pivoted, as at 80, to a bracket plate 82 attached to the base 26. The arm 78 includes a cutout portion adjacent its end, as at 84, formed so as to provide a generally semicircular shape to receive in snap-fastening relation the drive shaft 48. Preferably, the distance between the pivot axis 80 of the arm 78 and the near edge 86 of the cutout portion 84 is sufficient to cause lateral shifting movement of the drive shaft 48 outwardly upon downward or clockwise pivotal movement (FIG. 5), thereby to move the worm gear 70 out of engagement with the gear thread 72 and vice versa upon swinging movement of the arm 78 in the opposite direction.

Figure 7:
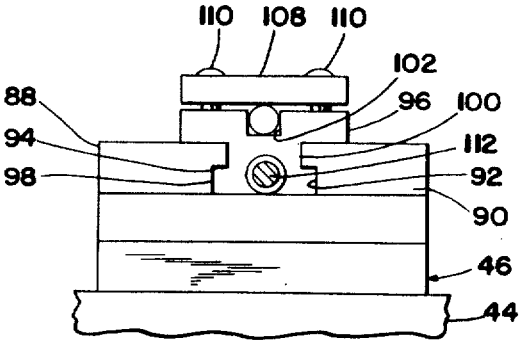
FIG. 7 is an enlarged, fragmentary vertical section view taken along the line 7—7 of FIG. 3.

The head 46 mounted on the support table 42 includes a pair of laterally spaced, oppositely disposed block-like guide members 88 and 90. The guide members 88 and 90 each include generally L-shaped recessed portions 92 and 94 (FIG. 7) which act as keyway guides. Disposed between the guide members 88 and 90 for reciprocal sliding movement thereon is a carriage 96 which has complementary, generally L-shaped recessed portions 92 and 94 of the guide members 88 and 90. The carriage 96 preferably has an elongated slot 102 extending longitudinally thereof and which has a width sufficient to receive therein a generally cylindrical support member 104.

Figure 2:
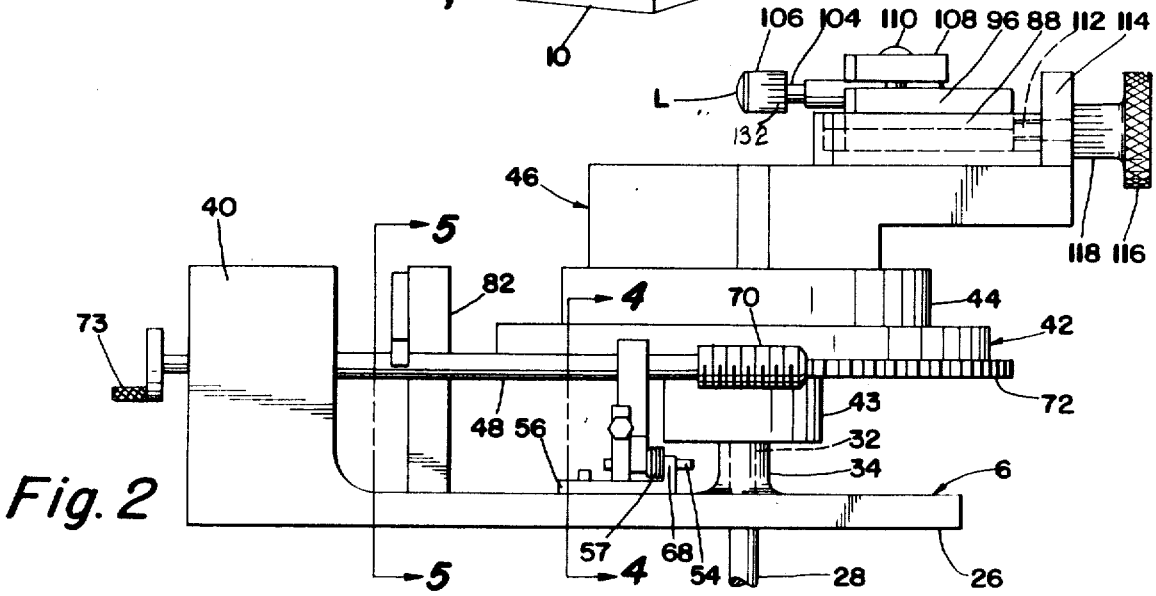
FIG. 2 is an enlarged, fragmentary side elevational view of the novel lens supporting means removed from the assembly of FIG. 1.
Figure 3:
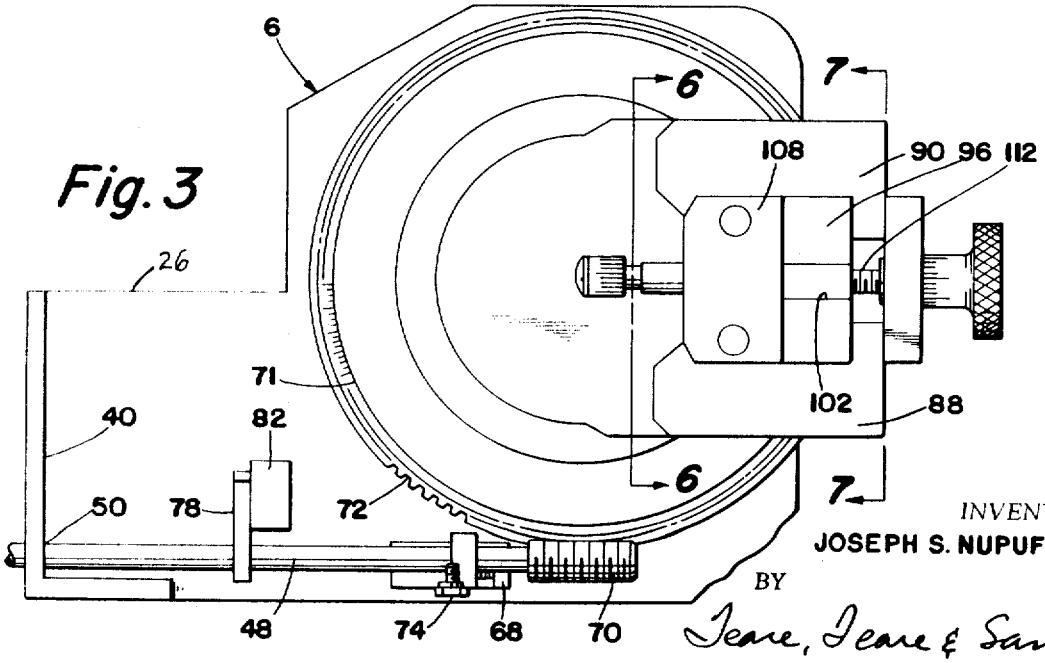
FIG. 3 is an enlarged, fragmentary top plan view of the novel lens supporting means of FIG. 2.

As seen in FIGS. 2 and 3, the support member 104 includes a detachable sleeve 106 which is rotatably mounted on one end thereof and which is adapted to mount thereon an optic to be tested L, such as a lens. The optic may be attached by a suitable adhesive or bonding-like material, in a manner as known in the art. The other end of the support member 104 may be clamped within the slot 102 by means of a cover plate 108 which is detachably mounted on the carriage 96 by suitable bolts 110.

The carriage 96 is traversed in a generally horizontal plane by means of a threaded screw 112 threaded at one end into the carriage 96 and at the other end into a bracket plate 114 attached to the head 46. The screw 112 may be actuated by a suitable dial handle 116 which may be calibrated, as at 118, so as to indicate the extent of traverse movement of the carriage 96 and hence, to indicate the exact traverse position of the lens L by the support member 104. By this arrangement, the head 46 of the lens measuring means 6 can be precisely rotated about the vertical axis Y—Y while the carriage 96 mounting the support for the lens L can be traversed backwardly and forwardly toward and away from the eyepiece 18 of the lens measuring instrument (FIG. 1) for precisely measuring the curvature of the lens L from its geometric center C (FIG. 8) to its peripheral edge along a horizontal plane or meridian thereof.

Figure 8:
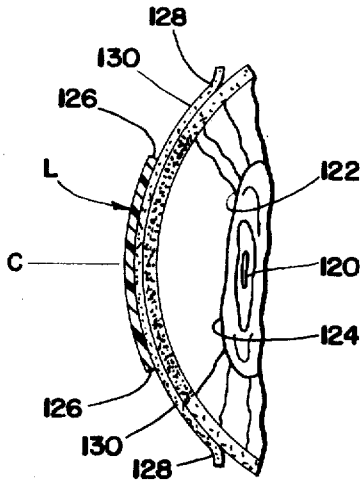
FIG. 8 is an enlarged, longitudinal section view taken through the human eye.

In accordance with the invention, multiple measurement of the varying curvatures of a lens can be taken from the apex to the periphery. As seen in FIG. 8, the crystalline lens of the eye is indicated at 120 in front of which there is an iris 122 which defines the pupil 124. As shown, the cornea is designated at 126 and the sclera at 128. Accordingly, the limbus portion of the eye is indicated generally at 130. As shown, the lens L, such as a contact lens, is basically concave-convex in section so that when applied to the interior surface of the eye it substantially covers the area defined by the limbus 130.

In a typical application of the operation of the lens measuring means 4 and the lens support means 6 reference may be had to FIGS. 9 to 11B. In such case, the lens support means 6 is simply mounted on the lens measuring means 4 by inserting the shaft 28 into the bore 38 provided in the arm 24. In measuring a convex surface, the lens L such as a contact lens, is attached to the sleeve 106 of the support member 104. The sleeve 106 may be rotated about its longitudinal axis so as to enable measurement of the lens in the desired meridian. The lens measuring means 4 may then be raised or lowered by the adjustment screw 20 until the optical axis of the instrument is in axial alignment with the longitudinal central axis of the support member 104 which mounts the lens L so as to be disposed along the common line of sight X—X, as seen in FIG. 9. The carriage 96 mounting the lens L may then be moved forwardly by turning the calibrated dial 116 until the center of the front surface of the lens (dotted line) is preferably located at the point of intersection P of the pivotal vertical axis Y—Y with the optical axis along the common line of sight X—X.

Figure 10A:
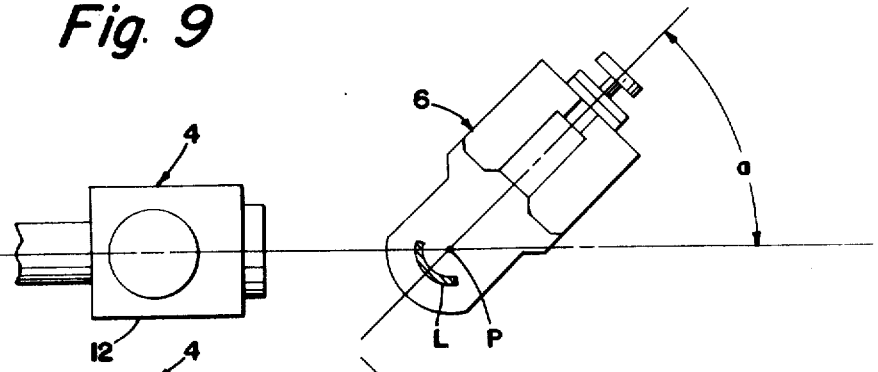
Figure 10B:
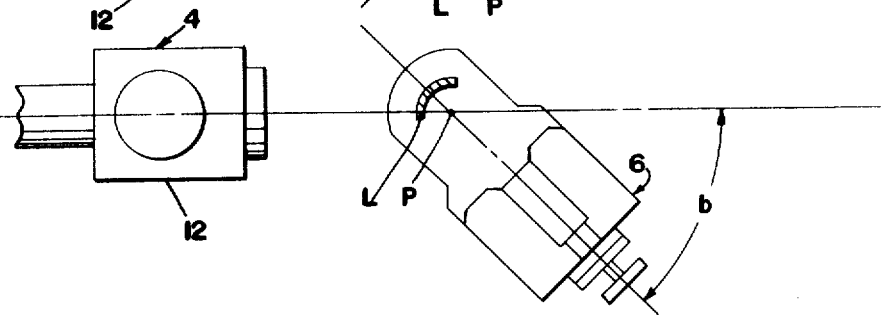

The movement establishes the initial or standard reference point for rotation of the support table 42 which reference point can be determined by calibrations 71 (FIG. 3) on the table. In the case of the convex lens, the carriage 96 is then moved forwardly by means of the calibrated dial 116 toward the head 12 of the lens measuring means 4 until the apex defined by the rear surface is located at the point of intersection P. The distance designated at "d" may be about 8.17 mm. which represents an approximation of the radius curvature of the lens adjacent its geometrical center. Since movement of the carriage 96 is calibrated, as at 118, this radius of curvature reading can be determined and reset, as desired. The lens system of the head 12 may then be focused (via cross-hairs) by adjustment of the screw 21. The support table 42 mounting the carriage 96 may then be rotated about the vertical axis Y—Y of pivot center P by actuation of the handle 73 which causes the worm gear 70 to be brought into meshing engagement with the endless thread 72. For example, the support table 42 may be rotated initially through an angle (a), such as 10°, 20°, 30°, etc., in a counterclockwise direction so as to progressively measure the radius of curvature of the lens L along a horizontal plane completely out to the peripheral edge of the lens. The radius of curvature readings can then be determined by adjustment of the mires by the calibrated dials 25 (FIG. 1) which may be read directly in millimeters and converted into diopters by means of a suitable chart, as known in the art. Thus any deviation in curvature can be determined by adjustment of the separation of the mires and realignment of the mires for a given point. In a like manner, the support table 42 mounting the carriage 96 may be rotated in the opposite or clockwise direction through an angle (b) so as to progressively measure out to the opposite peripheral edge of the lens, as seen in FIG. 10B. To measure the lens L in another meridian, the sleeve 106 which is also calibrated, as at 132, may be rotated to orient the lens for measurement of the desired meridian, thereby to enable accurate measurement over the entire optical surface of the lens.

By this arrangement, the apex of the rear surface of the lens, as in the case of a convex lens, remains substantially in coincident alignment at the pivotal center P, whereby any number of incremental readings can be taken for precisely and accurately measuring the radii of curvature of a lens from its geometrical center along a horizontal plane to the peripheral margin thereof, and also to determine the trueness of any variations of the curvature along this horizontal plane.

Figure 11A:
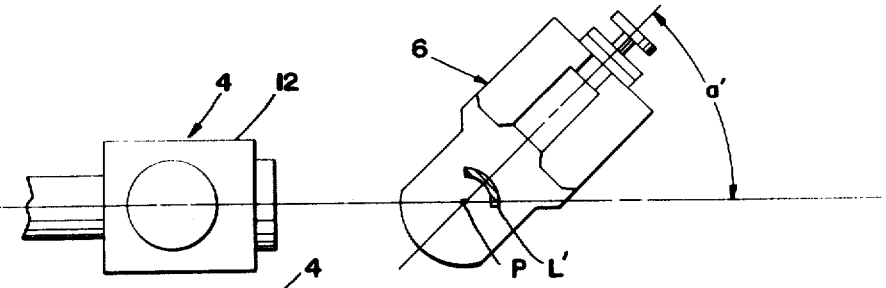
Figure 11B:
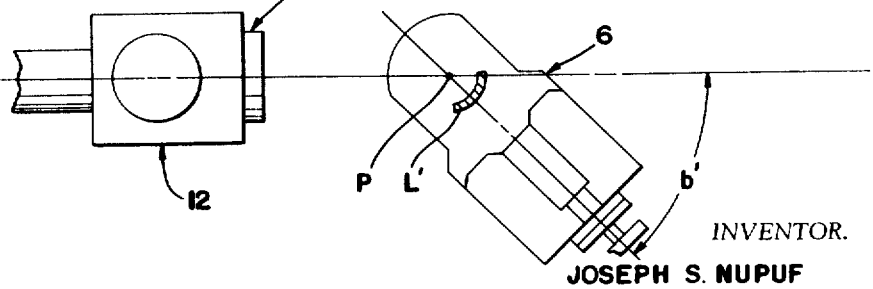

In measuring a concave surface, such as a concave lens L′, from its geometrical center along a horizontal plane to its peripheral edge, the above procedure is essentially followed, as seen in FIGS. 11A and 11B. In this form, however, the carriage 96 mounting the lens L′ is traversed axially backwardly in a direction away from the head 12 of the lens measuring means 4 so that the apex of the rear surface of the lens is substantially in coincident alignment at the point of pivotal intersection P. The support table 42 mounting the carriage 96 is then progressively rotated about the pivotal center P and the lens measured in the selected meridian in the manner, as aforesaid.

In accordance with another method of the invention, the center of the lens L mounted on the support member 104 may be rotated into axial alignment with the optical axis of line of sight X—X of the lens measuring means 4 by actuation of handle 73. The eyepiece 18 (via its hairlines not shown) may then be focused by actuation of screw 21 until the mires and hairlines are both in sharp focus to give reference point P. The radius of curvature of the lens L may then be determined by actuation of the calibrated dials 25 until the vertical lines of the mires are in proper alignment. This establishes the initial radius of curvature of the lens which may be about 8.17 mm., as aforesaid. The worm gear 70 may then be disengaged from the endless thread 72 via locking means 76 and the table 42 rotated (clockwise or counterclockwise) so that the lens is rotated out to an extreme peripheral edge thereof. In measuring a convex lens, the carriage 96 may then be moved toward the head 12 of the lens measuring means by actuation of dial 116 and the eyepiece 18 (cross hairs) focused by the screw 21. When focused, the support member 104 is moved past the reference point P by the distance "d," such as about 8.17 mm., which represents an approximation of the radius of curvature of the lens and which establishes a constant reference point. The worm gear 70 may then be engaged with the endless thread 72 so that the table 42 mounting the lens can be slowly rotated about vertical axis Y—Y for measuring the curvature of the lens in a horizontal plane throughout its entire surface. In the case of a perfect optical curvature lens there would be no deviation of the mires or in the focus of the lens measuring instrument 4. Any deviation, aberration, defect or other variance in the lens surface is readily indicated by a separation of the mires (vertical lines) which are then realigned by actuation of dial 25 to indicate the change of radii at that particular point on the lens surface. In measuring a concave lens the same procedure would be followed, except that the carriage would be moved away from the measuring means 4 to establish reference point P in the manner, as aforesaid.

This last mentioned method is particularly advantageous in measuring optics of similar design and construction for mass production wherein by two simple and rapid operations the optical system can be accurately measured throughout its entire optical surface for any deviations in the spherical aspects of the optic, thereby indicating any aberrations or defects in the optical system.

Through the foregoing description and accompanying drawings have been given with reference to the measurement of an optic, such as a contact lens, it is to be understood that the invention may also be advantageously employed in the measurement of all types of lens and/or mirror surfaces, such as spherical, ellipsoid, parabolic, etc., for measuring the trueness of radii, aberrations, astigmatic curvatures, or any variation in such curvatures.

Similarly, though the invention has been described in connection with the use of a measuring instrument, such as a keratometer, ophthalmometer or the like, it is to be understood that other such instruments may also be employed in accord with the principles of the invention. For details of the construction and operation of a typical ophthalmometer reference may be had to U.S. Pat. 1,750,931 to Kellner et al.

Thus, while there is illustrated herein a preferred embodiment of the invention, it is to be understood that changes and variations may be made by those skilled in the art without departing from the spirit and scope of the appended claims.

I claim:

1. In a system for measuring optics or the like comprising, a measuring means including a lens system having a relatively fixed optical axis for measuring the curvature of the optical surface of an optic, a supporting means detachably mounted on said measuring means for supporting said optic in alignment with said optical axis, said supporting means pivotally mounted on said measuring means for rotation in a horizontal plane about a vertical axis which intersects said optical axis, a carriage means movably mounted on said support means for movement relative to said measuring means, an adjustment means operably coacting with said carriage means for selectively positioning the apex of the optical surface of said optic substantially at the point of intersection of said optical axis and said vertical axis, and said supporting means including another adjustment means for rotating said optic about said vertical axis for measuring the curvature of said optical surface from its geometrical center along a horizontal plane [to] *toward* its peripheral edge.

2. In a system in accordance with claim 1, wherein said measuring means includes a base, said supporting means including a support table pivotally mounted on said base having its pivotal axis coextensive with said first mentioned vertical axis, and said other adjustment means operably connected to said support table for rotation of said carriage means in a horizontal plane about said vertical axis.

3. In a system in accordance with claim 2, wherein said carriage means includes a head mounted on said support table, a carriage member is mounted on said support table adapted for reciprocal sliding movement with respect thereto, and a support member rotatably mounted on said carriage member and adjustable about a horizontal axis adapted for supporting and rotating said optic into a predetermined meridian for measurement,

4. In a system in accordance with claim 1, including indicating means for determining the extent of rotation of said supporting means.

5. In a system in accordance with claim 1, wherein said carriage means includes a support member detachably mounted thereon and adapted for supporting said optic, and said support member being rotatably adjustable about a horizontal axis for rotating said optic into a predetermined meridian for measurement.

6. In a system in accordance with claim 1, including an indicating means operably associated with said first mentioned adjustment means for determining the extent of movement of said carriage means.

7. In a system in accordance with claim 3, including a locking means carried by said supporting means, and said locking means is operably connected to said other adjustment means for selective engagement and disengagement of said other adjustment means with said support table.

8. A support device for supporting an optic on a measuring instrument of the type having a lense system including a relatively fixed optical axis for measuring the curvature of the oputical surface of said optic comprising, a supporting means detachably mounted on said measuring instrument for supporting said optic in alignment with said optical axis, said supporting means pivotally mounted on said measuring instrument for rotation in a horizontal plane about a vertical axis which intersects said optical axis, a carriage means movably mounted on said support means for movement relative to said measuring instrument, adjustment means operably coacting with said carriage means for selectively positioning the apex of said optical surface of said optic substantially at the point of intersection of said optical axis and said vertical axis, and said supporting means including another adjustment means for rotating said optic about said vertical axis for measuring the curvature of its optical surface from its geometrical center along a horizontal plane [to] *toward* its peripheral edge.

9. A support device in accordance with claim 8, wherein said measuring instrument includes a base, said supporting means includes a support table pivotally mounted on said base having its pivotal axis coextensive with said vertical axis, and said other adjustment means operably connected to said support table for rotation of said carriage means in a horizontal plane about said vertical axis.

10. A support device in accordance with claim 8, wherein said carriage means includes a support member detachably mounted thereon and adapted for supporting said optic, and said support member being rotatably adjustable about a horizontal axis for rotating said optic into a predetermined meridian for measurement.

11. A support device in accordance with claim 8, including an indicating means associated with said first mentioned adjustment means for determining the extent of movement of said carriage means.

12. In a support device in accordance with claim 8, including a locking means carried by said supporting means, and said means is operably connected to said other adjustment means for selective engagement and disengagement of said other adjustment means with said support table.

13. A support device in accordance with claim 9, wherein said carriage means includes a head mounted on said support table, a carriage member is mounted on said support table adapted for reciprocal sliding movement with respect thereto, and a support member is rotatably mounted on said carriage member and adjustable about a horizontal axis adapted for supporting and rotating said optic into a predetermined meridian for measurement.

14. In a system in accordance with claim 8, including indicating means for determining the extent of rotation of said supporting means.

15. In a method for measuring the curvature of the optical surface of an optic by a measuring instrument of the type having a lens system including a relatively fixed optical axis, the steps comprising, mounting said optic in alignment with said optical axis on a pivotal support member adapted for rotation about a vertical axis which intersects said optical axis, aligning the apex of said optical surface in substantially coincident relation with the point of intersection of said optical axis with said vertical axis, progressively rotating said optic about said vertical axis which intersects said optical axis, and

*selectively* measuring the curvature of *the functional portion of* said optical surface [across its entire optical surface].

16. In a method in accordance with claim 15, including measuring the curvature of said optical surface from its geometrical center along a horizontal plane to its peripheral edge, rotating said optic back to its initial portion, and then progressively rotating said optic in the opposite direction about said vertical axis and measuring the curvature of said optical surface from its geometrical center through a horizontal plane [to] *toward* its opposite peripheral edge.

17. A method in accordance with claim 15, wherein said support member includes a support element selectively rotatable about a horizontal axis coincident with said optical axis, including selectively rotating said optic about said horizontal axis by a predetermined amount for measurement of another meridian of said optical surface, then progressively rotating said optic about said vertical axis, measuring the curvature of said optical surface from its geometrical center along a horizontal plane to its peripheral edge, rotating said optic back to its initial position, and then progressively rotating said optic in the opposite direction about said vertical axis for measuring the curvature of said optical surface from its geometrical center through a horizontal plane [to] *toward* its peripheral edge.

References Cited

The following references, cited by the Examiner, are of record in the patented file of this patent or the original patent.

UNITED STATES PATENTS

| | | | |
|---|---|---|---|
| 3,027,804 | 8/1962 | Wesley et al. | 356—124 |
| 3,404,936 | 8/1968 | Bennett et al. | 351—6 |

OTHER REFERENCES

Encyclopedia of Contact Lens Practice, September 1960, pp. 34–35.

"Oscillation Phacometer," Col. Ch. Deve, Revue d'Optique, vol. 2, 1923, No. 3.

RONALD L. WIBERT, Primary Examiner

C. CLARK, Assistant Examiner

U.S. Cl. X.R.

*356—127*; 351—6